(12) United States Patent
Sardesai

(10) Patent No.: US 6,522,455 B1
(45) Date of Patent: Feb. 18, 2003

(54) WDM OPTICAL COMMUNICATION SYSTEM HAVING A DISPERSION SLOPE COMPENSATING ELEMENT

(75) Inventor: Harshad Sardesai, Elkridge, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/506,007

(22) Filed: Feb. 17, 2000

(51) Int. Cl.⁷ .......................... G02F 1/33; G02F 1/295; H04J 14/02; H04B 10/00
(52) U.S. Cl. .................. 359/305; 359/124; 359/130; 359/134; 359/237; 359/153; 359/161; 385/10; 385/31; 385/37; 250/227.12; 250/227.14
(58) Field of Search ................................ 359/153, 161, 359/124, 130, 134, 237, 305, 180, 187, 173; 385/10, 12, 14, 16, 24, 31, 32, 37; 250/227.11, 227.12, 227.14

(56) References Cited

U.S. PATENT DOCUMENTS

| | | | | |
|---|---|---|---|---|
| 4,953,939 A | * | 9/1990 | Epworth ...................... | 359/173 |
| 5,557,439 A | | 9/1996 | Alexaner et al. ........... | 359/130 |
| 5,696,615 A | * | 12/1997 | Alexander .................. | 359/134 |
| 5,742,416 A | | 4/1998 | Mizrahi ...................... | 359/134 |
| 5,938,309 A | * | 8/1999 | Tayler ........................ | 359/124 |
| 6,243,176 B1 | * | 6/2001 | Ishikawa et al. ............ | 359/124 |
| 6,275,315 B1 | * | 8/2001 | Park et al. ................... | 385/24 |
| 6,281,997 B1 | * | 8/2001 | Alexander et al. .......... | 359/130 |
| 6,292,603 B1 | | 9/2001 | Mizuochi et al. ............ | 385/24 |

FOREIGN PATENT DOCUMENTS

| | | | | |
|---|---|---|---|---|
| EP | 0081881 | 6/1983 | | |
| EP | 0684709 | 11/1995 | .................... | 10/18 |
| EP | 0763907 | 3/1997 | .................. | 10/158 |
| EP | 0795973 | 9/1997 | .................... | 10/18 |

OTHER PUBLICATIONS

G. Lenz et al., "Dispersive Properties of Optical Filters for WDM Systems", IEEE Journal of Quantum Electronics, vol. 34, No. 8, Aug. 1998, pp. 1390–1402.

Patent Abstracts of Japan, Publication No. 2001053680, Jun. 5, 2001.

Patent Abstracts of Japan, Publication No. 11284263, Jan. 31, 2000.

\* cited by examiner

*Primary Examiner*—Loha Ben
(74) *Attorney, Agent, or Firm*—David L. Soltz

(57) ABSTRACT

Consistent with the present invention, in-fiber Bragg gratings are used to demultiplex optical signals in a WDM optical communication system. The in-fiber Bragg gratings also perform dispersion compensation of the selected optical signals. As a result, additional segments of DCF for further dispersion compensation are rendered unnecessary. Improved performance is thus achieved with an inexpensive and simplified system design.

14 Claims, 5 Drawing Sheets

WDM OPTICAL COMMUNICATION SYSTEM HAVING A DISPERSION SLOPE COMPENSATING ELEMENT

The present invention is directed toward optical communication system. In particular, optical communication systems providing dispersion slope compensation.

BACKGROUND OF THE INVENTION

Optical signals transmitted in a fiber optic communication system typically constitute a series of pulses of digital information. Although the pulses are usually at a single nominal wavelength, each pulse is actually composed of different spectral components. These spectral components propagate through the transmission fiber at different speeds with higher frequency components traveling slower than lower frequency components. This effect, known as "chromatic dispersion", can result in spectral components of one pulse arriving at a receiver at substantially the same time as a succeeding pulse, thereby causing degraded receiver sensitivity. Chromatic dispersion becomes increasingly pronounced at higher bit rates, e.g. 10 Gbit/sec. such as those associated with synchronous optical network (SONET) OC192 transmission speeds. Unique fibers have been developed to offset or compensate chromatic dispersion. These fibers, referred to as dispersion compensated fiber or DCF, are commercially available from Corning Inc. and Lucent Technologies, for example. DCF fibers are typically specified with a dispersion coefficient having an opposite sign to that of the transmission fiber. The net dispersion experienced by the transmitted optical signal is thus the sum of the dispersion accumulated through the transmission fiber and the DCF. If the product of dispersion coefficient times length in the DCF is equal in magnitude and opposite in sign to that of the transmission fiber, the net dispersion is zero, and the dispersion is said to be compensated.

DCF typically provides compensation at a particular wavelength. As a result, single wavelength optical transmission systems incorporating DCF and operating at the specified wavelength can have relatively low error rates, even at OC192 transmission speeds.

In order to further increase fiber capacity, wavelength division multiplexed (WDM) systems have been developed for carrying multiple wavelengths on a single fiber. At OC192 rates, each wavelength or channel of a WDM system must be dispersion compensated. Typically, the dispersion coefficient of the transmission fiber, as well as that associated with DCF, varies with wavelength; the relationship of dispersion and wavelength being referred to "dispersion slope". Since the dispersion slope associated with the transmission fiber and DCF may not be identical, not all channels may be adequately dispersion compensated.

Theoretically, one approach to providing spectrally uniform dispersion compensation involves fabricating DCF uniquely tailored to have a slope of the same magnitude, but opposite sign, as the transmission fiber. As a practical matter, however, such DCF would be difficult to fabricate with precisely the required slope and magnitude.

Alternatively, since the amount of dispersion compensation depends in part on the length of the DCF, varying lengths of DCF can be provided in a WDM system downstream from the point where individual wavelengths have been separated. Each channel can then be compensated individually prior to detection at a photodetector. An additional segment of DCF, however, must be provided for each channel, thereby complicating system design and increasing costs.

SUMMARY OF THE INVENTION

Consistent with the present invention, an optical device is provided comprising an optical splitter having an input port and a plurality of output ports, said input port being configured to receive a plurality of optical signals, each at a respective one of a plurality of wavelengths. The optical signals are output from each of the plurality of output ports, but in attenuated form. The optical device further includes a plurality of in-fiber Bragg gratings, each of which being coupled to a respective one of the plurality of output ports. The in-fiber Bragg gratings are configured to reflect a selected one of the plurality of optical signals and compensate for a dispersion associated with the selected one of the plurality of optical signals.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Consistent with the present invention, in-fiber Bragg gratings are used to demultiplex optical signals in a WDM optical communication system. The in-fiber Bragg gratings also perform dispersion slope compensation of the selected optical signals. In particular, the amount of dispersion of the different gratings corresponding to the different channels in a WDM system is chosen so as to provide a dispersion versus wavelength characteristic which is equal in magnitude and opposite in sign to residual dispersion experienced by the different channels output from the WDM demultiplexer. As a result, additional segments of DCF for further dispersion compensation are rendered unnecessary. Improved performance is thus achieved with an inexpensive and simplified system design.

Figure 1:
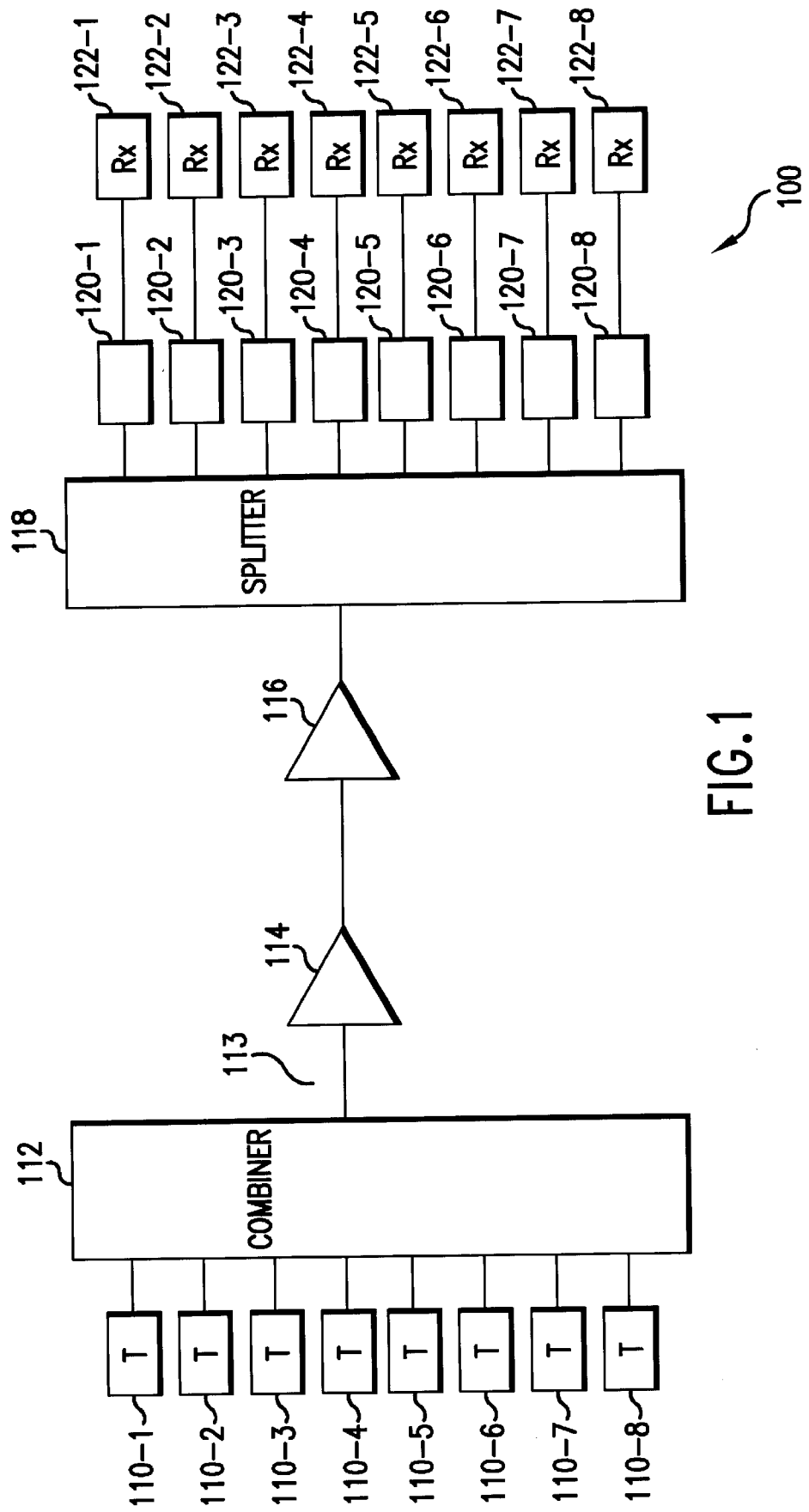
FIG. 1 illustrates an optical communication system consistent with the present invention.

Turning to the drawings in which like reference characters indicate the same or similar elements in each of the several views, FIG. 1 illustrates a WDM optical communication system 100 consistent with the present invention. System 100 includes a plurality of optical transmitters 110-1 to 110-8, described for example in U.S. Pat. No. 5,696,615, incorporated by reference herein, each of which emitting optical signal at a respective wavelength often within a narrow range of 1550 nm, the low loss band associated with silica based fibers. The optical signals are fed to a conventional optical combiner 112, which supplies multiplexed or combined optical signals onto an optical communication path 113, including, for example, a silica based optical fiber.

The optical signals propagate along path 113 and can be periodically amplified by optical amplifiers 114 and 116. Although only two optical amplifiers are shown in FIG. 1, any appropriate number of amplifiers can be provided.

Figure 2:
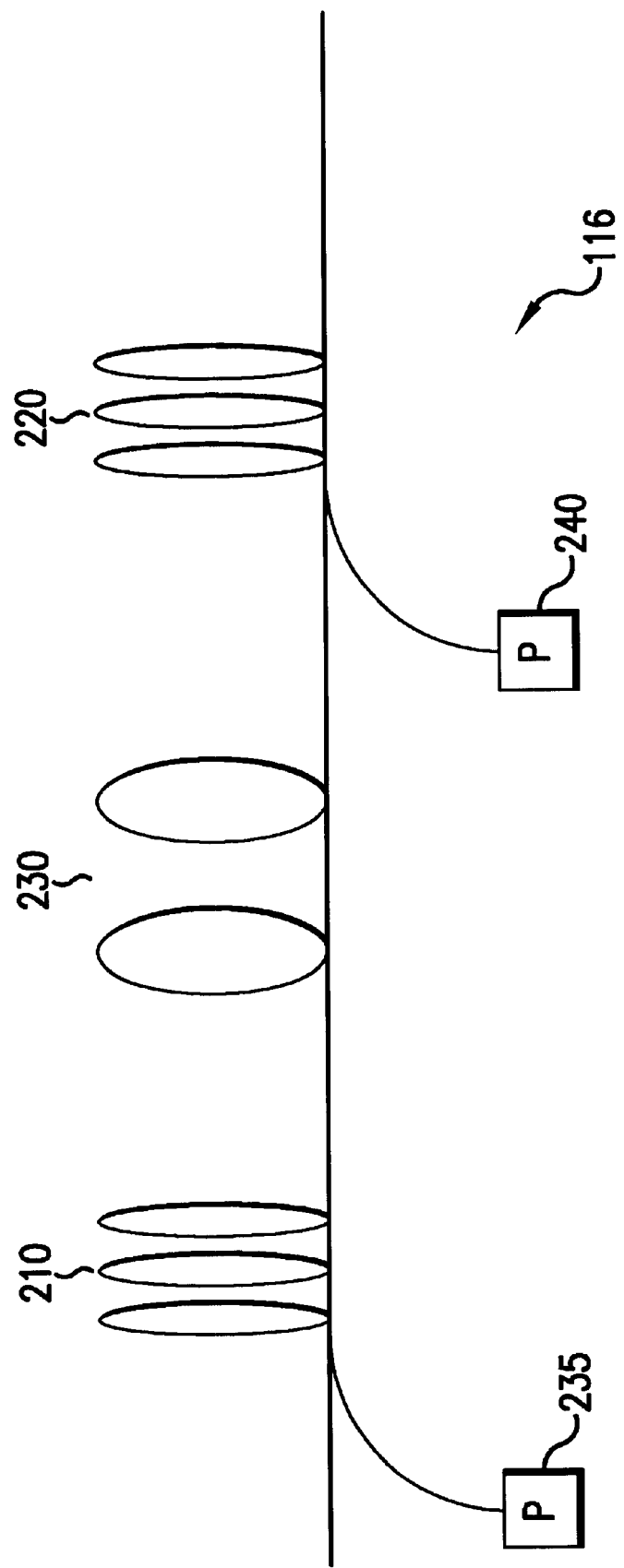
FIG. 2 illustrates various components of an optical amplifier.

FIG. 2 illustrates optical amplifier 116 in greater detail. Optical amplifier 116 can include two segments of optical fiber 210 and 220 doped with a fluorescent material, such as erbium. Each erbium doped fiber 210 and 220 are respectively pumped by lasers 235 and 240, respectively, at wavelengths of 980 nm and 1480 nm, for example, in order to achieve optical gain therein. A segment of DCF can also be provided interposed between erbium doped fibers 210 and 220 for providing a suitable amount of dispersion compensation. Amplifiers 114 and 116 can have a similar configuration.

Returning to FIG. 1, optical signals emitted by amplifier 116 are input to a demultiplexer including conventional optical splitter 118, which outputs the optical signals in attenuated form to each of selectors 120-1 to 120-8. Each of selectors 120-1 to 120-8 outputs optical signal at a particular wavelength to a corresponding optical receiver 122-1 to 122-8. Each of optical receivers 122-1 to 122-8 includes for example a photodetector and other appropriate circuitry for sensing the received optical signal and outputting corresponding electrical signal.

Figure 3:
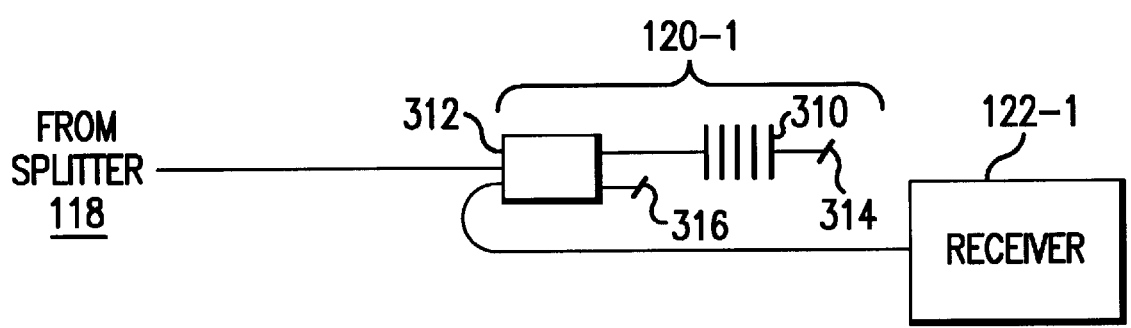
FIG. 3 illustrates an exemplary optical selector consistent with the present invention.

FIG. 3 illustrates a combination of selector 120-1 and receiver 122-1 in greater detail. Selector 120-1 receives the multiplexed optical signals from an output of splitter 118. Within selector 120-1 the multiplexed optical signals are supplied to an in-fiber Bragg grating 310 through coupler 312. The in-fiber Bragg grating passes optical signals having wavelengths other than the optical signal wavelength to be sent to receiver 122-1. These non-selected optical signals pass through low reflectivity port 314 and exit the optical communication system. The low reflectivity port 314 is typically an angled fiber cut, although any low reflectivity waveguide termination technique may be employed. The selected optical signal at the desired wavelength is reflected by in-fiber Bragg grating 310 to receiver 122-1 through coupler 312. Any unused optical signals exit coupler 312 through low reflectivity port 316.

In-fiber Bragg grating 310 may be made in a conventional manner by exposing a fiber to ultra-violet light. The light typically has periodic variations of intensity to create corresponding variations in refractive index of the fiber. The pitch associated with these variations determines, in part, the wavelength of light to be reflected by the grating.

Figure 4:
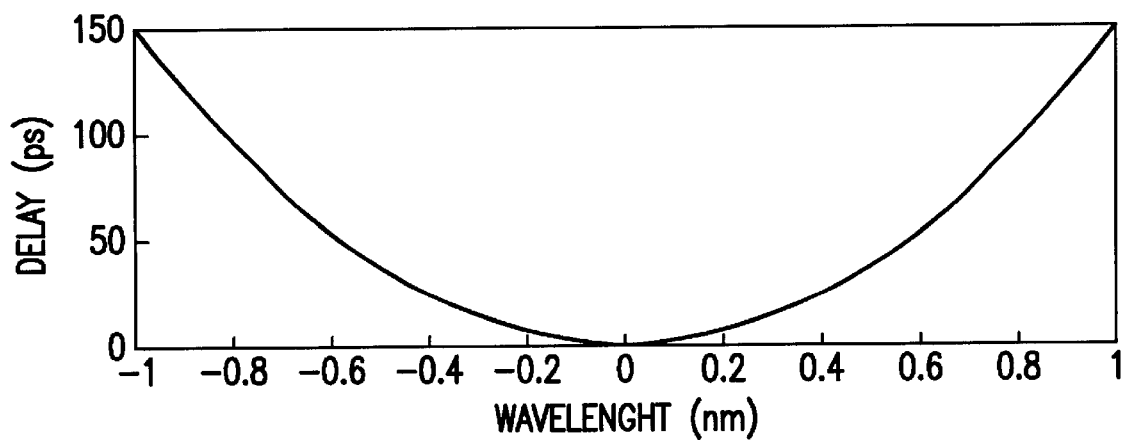
FIG. 4 illustrates a group delay vs. wavelength for an in-fiber Bragg grating used in conjunction with the present invention.

In-fiber grating 310 also has a dispersion, which, as generally understood, is based, in part, on the amount of refractive index modulation, the amount of optical energy present in the core of the fiber, Bragg wavelength (i.e., the wavelength reflected by the grating), and the average refractive index of the grating, as described, for example, in G. Lenz et al., IEEE Journal of Quantum Electronics, vol. 34, no. 8, August 1998, p. 1390, incorporated by reference herein. By appropriately choosing these parameters, a desired group delay curve can be obtained, as seen in FIG. 4. The group delay represents the delay between low and high frequency components of the optical signals propagating through the optical fiber. Dispersion can be defined as the rate at which the group delay changes with wavelength, i.e., the first derivative of the group delay with respect to wavelength. Here, the group delay curve is substantially quadratic, and thus, by taking the first derivative of this curve, a substantially linear dispersion vs. wavelength curve, or dispersion slope can be obtained, as illustrated in FIG. 5.

Figure 5:
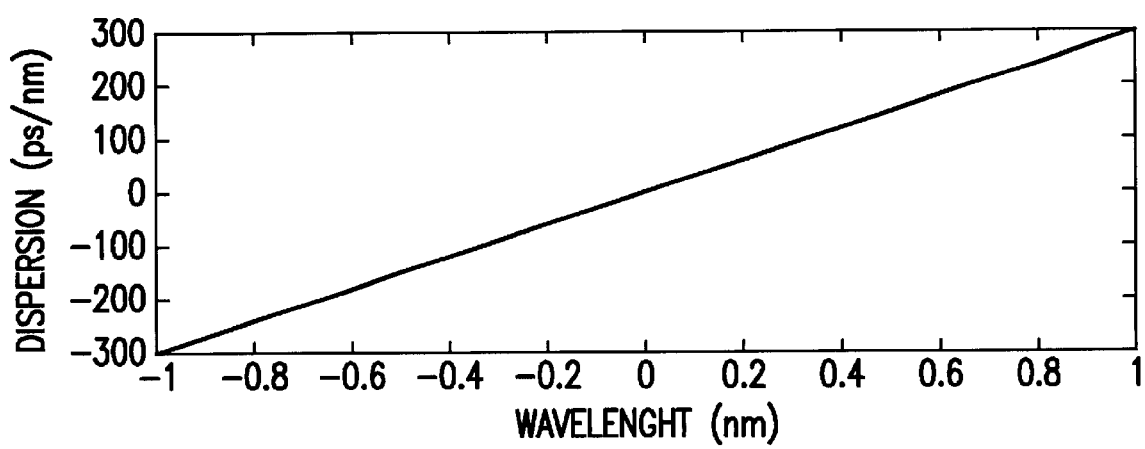
FIG. 5 illustrates a plot of dispersion vs. wavelength based on the curve illustrated in FIG. 4.
Figure 6:
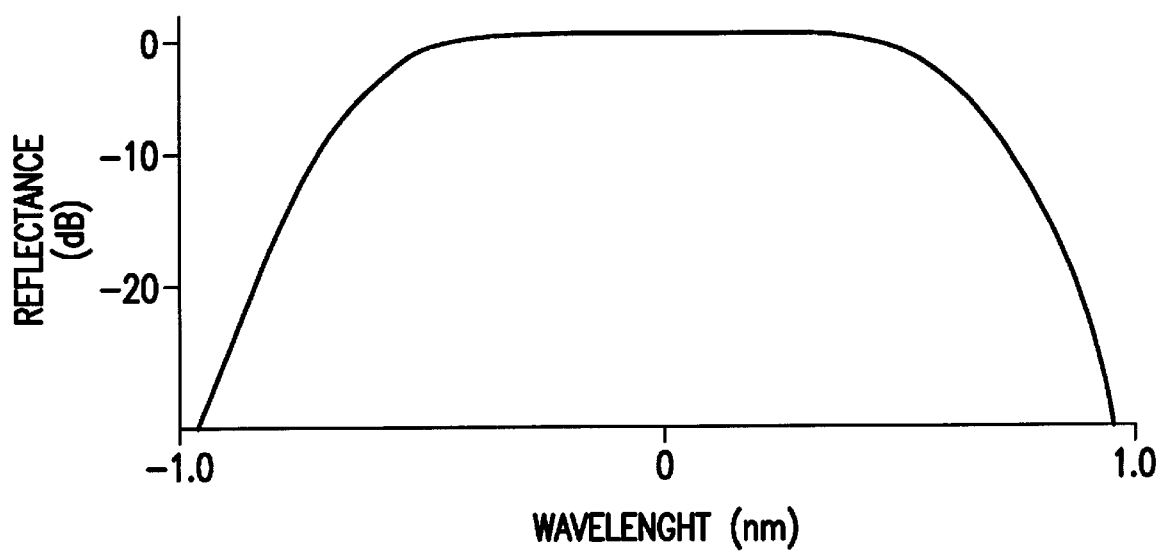
FIG. 6 illustrates the optical reflectance characteristic of the in-fiber grating used in conjunction with the present invention.

FIG. 6 illustrates a reflectance characteristic of in-fiber Bragg grating 310. Note that the horizontal axes in FIGS. 4–6 correspond to the bandwidth of grating 310. Moreover, during typical operation, the wavelength of a channel selected by grating 310 would likely lie in the center of the grating bandwidth and would have nominally zero dispersion.

The curve shown in FIG. 5 can be shifted to the right or left, e.g., by altering the temperature of the grating. Thus, for example, if the residual dispersion associated with a given optical signal at a particular wavelength in WDM system 100 is 150 ps/nm after propagating through DCF in amplifiers 114 and 116, a selector grating can be fabricated with appropriate parameters described above, and temperature tuned if necessary, to yield a dispersion of −150 ps/nm at the desired wavelength. Accordingly, the net dispersion experienced by the optical signal is 150 ps/nm+−150 ps/nm, or zero. The grating thus simultaneously performs both optical signal demultiplexing or selection and dispersion compensation. As a result, fewer components are required in the optical system and costs are reduced.

It is noted that the grating need not compensate optical signal dispersion entirely, but may reduce net dispersion to within a range or margin acceptable for a given system. This range can be, for example, ±200 ps/nm.

Alternatively, if the passband is flat enough the WDM channels could be detuned from the center to either the left or right so that now the channels don't experience zero dispersion, but experience a finite amount of dispersion. The direction of detuning would depend on the amount of residual dispersion that the channel under consideration has.

Other techniques of shifting the group delay and dispersion curve would include, for example, applying an approximate amount of mechanical strain on the grating, or chirping the pitch of the grating.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device, comprising:
   an optical splitter having an input port and a plurality of output ports, said input port being configured to receive a plurality of optical signals, each at a respective one of a plurality of wavelengths, each of said plurality of output ports supplying said optical signals in attenuated form; and
   a plurality of in-fiber Bragg gratings, each of which being coupled to a respective one of said plurality of output ports, each of said plurality of in-fiber Bragg gratings being configured to reflect a respective one of said plurality of optical signals and substantially compensate for a dispersion associated with said respective one of said plurality of optical signals.

2. An optical device in accordance with claim 1, further comprising:
   a segment of dispersion compensating fiber coupled to said input port of said splitter, said segment of dispersion compensating fiber being configured to provide dispersion compensation for said plurality of optical signals.

3. An optical device in accordance with claim 1, wherein a dispersion imparted by each of said plurality of in-fiber Bragg gratings varies as a function of wavelength.

4. An optical device in accordance with claim 3, wherein said dispersion imparted by each of said plurality of in-fiber Bragg gratings is equal in magnitude and opposite in sign to a residual dispersion associated with each said respective ones of said plurality of optical signals such that a net dispersion of said respective ones of said plurality of optical signals is substantially zero.

5. An optical device in accordance with claim 3, wherein said dispersion imparted by each of said plurality of in-fiber Bragg gratings varies in such a manner so that each of said plurality of optical signals reflected by a respective one of said plurality of in-fiber Bragg gratings has substantially the same net dispersion.

6. An optical device in accordance with claim 1, wherein a net dispersion associated with each of said plurality of optical signals after passing through said plurality of in-fiber Bragg gratings is within a range of ±200 ps/nm.

7. An optical communication system, comprising:

a plurality of optical transmitters, each supplying a corresponding one of a plurality of optical signals, each of said optical signals being at a respective wavelength;

an optical combiner having a plurality of inputs and an output, said optical combiner receiving each of said plurality of optical signals at a respective one of said plurality of inputs, and supplying said plurality of optical signals through said output;

an optical communication path carrying said plurality of optical signals;

an optical splitter coupled to said optical communication path, said optical splitter having an input and a plurality of outputs, said optical splitter input receiving said plurality of optical signals, and each of said plurality of optical splitter outputs supplying said plurality of optical signals in attenuated form; and a plurality of in-fiber Bragg gratings, each coupled to a respective one of said plurality of optical splitter outputs, each of said plurality of in-fiber Bragg gratings being configured to reflect a respective one of said plurality of optical signals and compensate for a dispersion associated with said respective one of said plurality of optical signals.

8. An optical communication system in accordance with claim 7, further comprising:

a segment of dispersion compensating fiber coupled along said optical communication path, said segment of dispersion compensating fiber being configured to provide dispersion compensation for said plurality of optical signals.

9. An optical communication system in accordance with claim 7, wherein a dispersion imparted by each of said plurality of in-fiber Bragg gratings varies as a function of wavelength.

10. An optical communication system in accordance with claim 9, wherein said dispersion imparted by each of said plurality of in-fiber Bragg gratings is equal in magnitude and opposite in sign to a residual dispersion associated with each of said respective ones of said plurality of optical signals such that a net dispersion of said respective ones of said plurality of optical signals is substantially zero.

11. An optical communication system in accordance with claim 9, wherein said dispersion associated with each of said plurality of in-fiber Bragg gratings varies in such a manner so that each of said plurality of optical signals reflected by a respective one of said plurality of in-fiber Bragg gratings has substantially the same net dispersion.

12. An optical communication system in accordance with claim 7, wherein a net dispersion associated with each of said plurality of optical signals after passing through said plurality of in-fiber Bragg gratings is within a range of ±200 ps/nm.

13. An optical communication system in accordance with claim 7, further comprising a plurality of optical amplifiers coupled to said optical communication path, said optical amplifiers being configured to amplify said plurality of optical signals.

14. A method, comprising the steps of: combining a plurality of optical signals onto an optical communication path;

transmitting said plurality of optical signals along said optical communication path;

substantially simultaneously separating and dispersion compensating said plurality of optical signals; and detecting said separated plurality of optical signals, wherein said separating and dispersion compensating steps are performed with an in-fiber Bragg grating.

* * * * *